Patented May 23, 1933

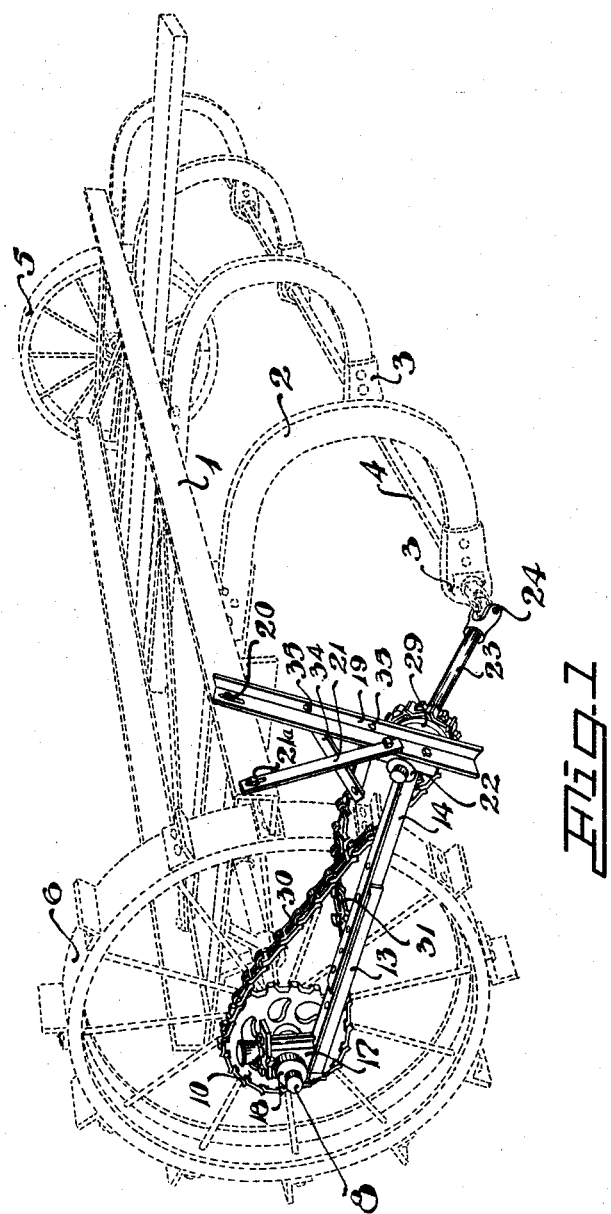

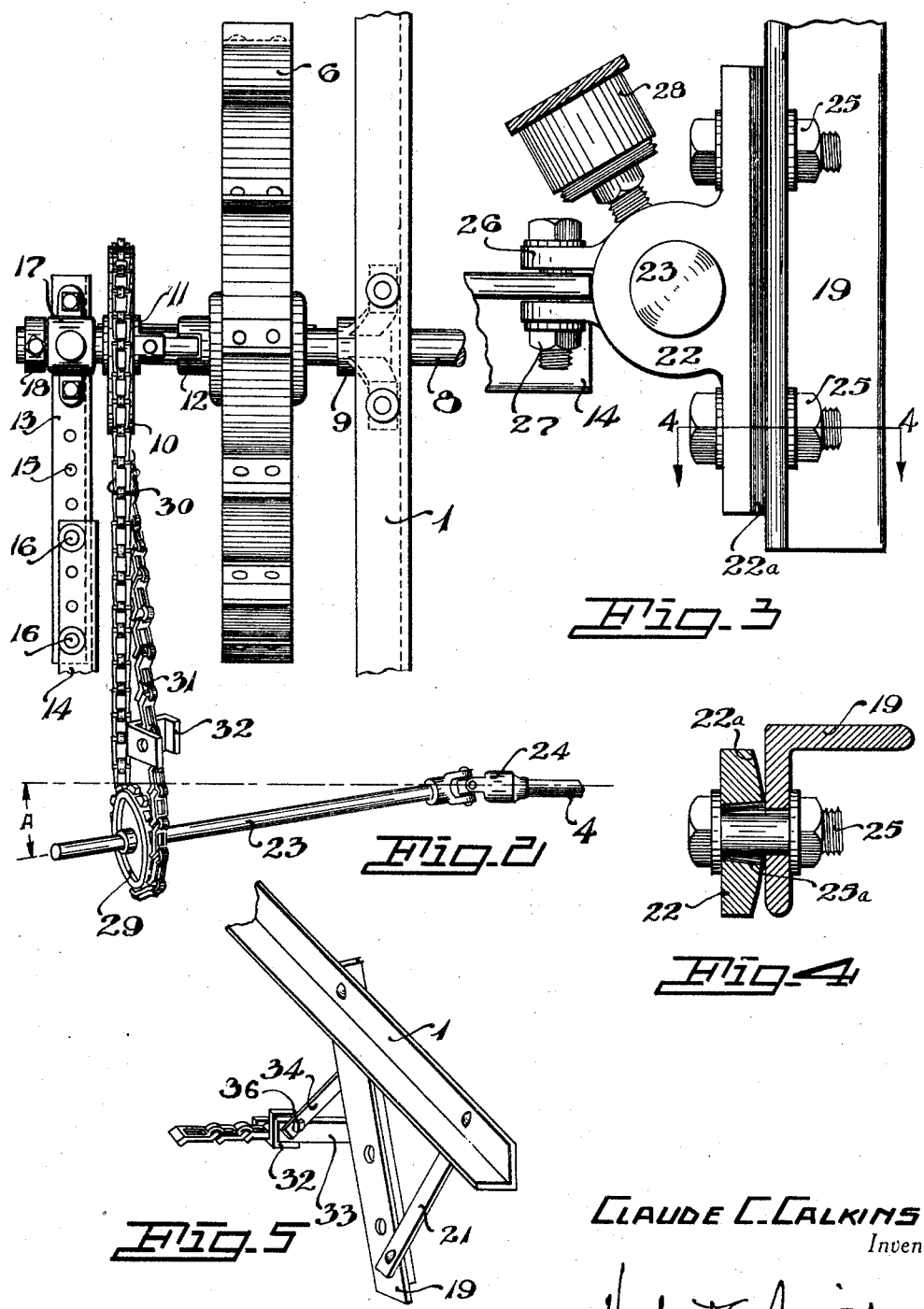

1,910,881

UNITED STATES PATENT OFFICE

CLAUDE C. CALKINS, OF SPOKANE, WASHINGTON

ROTARY WEEDER

Application filed December 16, 1931. Serial No. 581,323.

My present invention relates to improvements in rotary weeders and particularly to the driving mechanism and power transmission mechanism of these implements and similar implements. While I have illustrated and described the invention particularly as applied to rotary weeders, it will be understood that my invention may also be applied to and physically embodied in other implements.

In carrying out my invention I have successfully reduced the invention to actual practice as illustrated in the accompanying implement, which involves the use of a transversely disposed rotary rod located at the rear of the implement and revolved clockwise by means of power developed by the anti-clockwise rotation of a traction wheel of the implement. Thus, my improved driving and transmission mechanism is interposed between the traction or power wheel of the implement and the rotary weeder rod for the purpose of driving the latter in direction opposite to or the reverse of that of the traction or ground wheel of the implement.

In its physical embodiment, my invention, as an attachment to the weeder, is especially desirable because it possesses the characteristics of simplicity, ruggedness, durability, and reliability in operation, and is capable of facile adjustment, and repairs when necessary.

The invention consists in certain novel combinations and arrangements of parts involving the chain drive mechanism as will hereinafter more fully be pointed out and claimed. In the accompanying drawings I have illustrated one complete example of the physical embodiment of my invention in a rotary weeder in which the parts are combined and arranged according to the best mode I have thus far devised for the practical application of the principles of my invention.

Figure 1 is a perspective view at the left, rear, showing the implement in dotted lines, and the attachment embodying my invention applied thereto for operating the rotary rod at the rear of the implement.

Figure 2 is a top plan view of the driving mechanism embodying my invention, with parts omitted for convenience of illustration.

Figure 3 is a side view at the lower end of the auxiliary frame showing the bearing for the counter shaft, and connections thereto.

Figure 4 is a detail sectional view at line 4—4 of Figure 3.

Figure 5 is a perspective view of a portion of the auxiliary frame showing particularly the chain guide.

In order that the utility of the invention, and the relation of parts may readily be understood I have shown by dotted lines in Figure 1 a well known type of rotary weeder including the main frame 1 and the rearwardly extending, parallel, longitudinal beams 2 having bearings 3, in which the square weeder rod 4 revolves below the surface of the ground as the implement advances. The weeder rod in this instance turns clockwise and in direction opposite to that of the wheels 5 and 6, as the implement is drawn forward by suitable power applied to the draft tongue (not shown). The drive shaft or axle 8 of the implement, which is journaled in bearings 9 of the main frame, also turns anti-clockwise with the wheels 5 and 6, and the latter wheel transmits power through the drive shaft 8 and a driving gear or sprocket wheel 10 that is loose on the shaft. The sprocket wheel 10 is coupled to the traction wheel through the coaction of the two complementary clutch members 11 and 12, the former on the slidable sprocket wheel and the latter on the hub of the traction wheel, and suitable means are provided for shifting the clutch into and out of engagement.

Preferably at the left side of the implement, and extending rearwardly from the axle, an auxiliary frame is mounted, which frame includes an extension bar made up of angle irons 13 and 14 having series of bolt holes 15, and joined together by the use of bolts 16. This extension bar extends in an approximately horizontal plane below the shaft 8, and a bearing block 17 mounted on the bar is journaled on the shaft for the support of the extension bar at this point. A collar 18 is fixed on the end of the shaft to prevent displacement of the bearing block and permit the shaft to revolve in the block.

At its rear end the extension bar of the auxiliary frame is supported by means of an angle brace 19 forming part of the auxiliary frame, and the upper end of this brace is secured by a bolt and slot fastening 20 to the main frame 1 of the implement. As seen in Figure 1 the brace bar 19 extends downwardly and outwardly from the rear cross bar of the main frame 1, and a second brace bar 21 is bolted to the angle brace and also fastened by a bolt and slot at 21a to the main frame. By means of these bolt and slot fastenings, the rigid Y-brace, comprising the two members 19 and 21 may be vertically adjusted with relation to the main frame of the implement.

At the lower end of the angle brace 19 a bearing block 22 for the countershaft 23 is mounted. The countershaft is joined by means of the universal joint 24 to the left end of the rotary weeder rod 4. The bearing block is fastened to the angle brace by means of bolts 25 which pass through tapered holes 25a and the bearing block is provided with oppositely beveled faces 22a, in order, that, if necessary, the block may be adjusted relatively to the angle brace to which it is fastened or bolted.

As best seen in Figure 3, the bearing block 22 is fashioned with a pair of perforated ears or lugs 26, and a bolt 27 is passed through these lugs and through a bolt hole in the rear end of the section 14 of the side extension bar of the auxiliary frame, for fastening the bar to, and supporting it from the bearing block 22. Thus it will be seen that the extension bar 13—14, the angle brace 19, the brace 21, and the bearing block 22, together form a rigid auxiliary frame, supporting frame for the counter shaft 23, and the latter is also supported at the universal joint 24 with the rotary weeder rod 4.

An oil cup 28 is provided for the journal bearing 22—23 for lubrication of the countershaft in its bearing, and a driven sprocket wheel 29, preferably smaller in diameter than the drive sprocket 10, is mounted to revolve with the counter shaft, said driven sprocket being located at the inner or right side of the bearing on the angle brace.

A sprocket chain of suitable type joins the drive sprocket and the driven sprocket, and as shown, this chain is twisted so that its driving flight 30 passes forwardly over the top of the drive sprocket from under the bottom of the driven sprocket, and the slack or loose flight 31 passes from under the drive sprocket upwardly, and over the driven sprocket. This twisted arrangement of the drive chain transmits the anti-clockwise rotation of the traction wheel, axle and drive sprocket, and translates such rotation to a clockwise movement of the countershaft and weeder rod.

In order to prevent interference of the slack flight with the driving flight of the chain, and to guide the links of the chain to the teeth of the driven sprocket and thus prevent displacement of the chain, I provide a U-shaped guide 32 through which the elevated portion of the slack flight of the chain glides. This guide is supported from the angle brace, above the driven sprocket by means of two metal straps 33 and 34 which are bolted at 35 to the angle brace, and the bolt 36 secures the guide to the converging ends of these two metal straps 33 and 34.

In Figure 2 it will be noted that the countershaft 23 is swung on its pivotal or universal joint 24 at an angle to the axle or driving shaft 8, and the angle of divergence is indicated at the letter A and the dotted line. This arrangement of the countershaft, together with the use of the guide 32, insures that the chain suspended between the drive sprocket and the driven sprockets shall properly engage the teeth of the sprockets; prevents lateral friction and wear on the teeth of the sprockets; prevents frictional contact and abrasion between the two flights of the chain; and insures free movement and smooth operation of the sprocket chain on the sprocket wheels.

The relative adjustment of the driven sprocket is accomplished through adjustments of the auxiliary frame and the countershaft, and the angle of the countershaft may be varied until the exact adjustment is secured. The bearing block 22 through its tapered bolt holes and beveled faces may be properly adjusted and alined with the shaft 23 to prevent binding or pinching of the shaft in its bearing. The side extension bar 13—14 may be adjusted as to its length in order to compensate for and take up wear in the sprocket chain.

Due to the crossing or twisting of the chain, more than half of the teeth of each sprocket wheel are in working contact with the links of the chain, thereby providing a wide bearing for the drive sprocket and the driven sprocket on the chain, and insuring smooth co-action of the wheels with the links of the chain. The upward tilt of the countershaft at an angle as indicated in Figure 1, and the backward tilt, as indicated in Figure 2, together with the adjustment of the auxiliary frame which supports the countershaft and its connected parts, are instrumental in bringing the driven sprocket in proper relation to the drive sprocket in order that the drive chain may attain its highest efficiency in transmitting and translating the power from the main shaft or axle to insure a positive, smooth, and reliable operation of the rotary weeder rod 4.

By the utilization of the mechanism of my invention it will be apparent that a number of parts now commonly employed in rotary weeders are eliminated, and a minimum number of parts is substituted therefor in which simplicity of construction and of operation attained.

Having thus fully described my invention, what I claim as new and desire to secure by Letters Patent is:

1. The combination in a rotary weeder with its drive shaft and a drive sprocket thereon, of a driven shaft having its longitudinal axis disposed at an angle to the axis of the shaft and a sprocket thereon, a twisted drive chain on said sprockets to reverse the drive of the latter shaft, and means for adjusting the driven sprocket for facile operation of the drive chain.

2. The combination in a rotary weeder with its drive shaft and drive sprocket, and a supporting frame therefor, of an auxiliary, adjustable frame and adjusting means therefor, a countershaft having its longitudinal axis disposed at an angle to the shaft and journaled in the auxiliary frame and a sprocket on said countershaft, a twisted drive chain between said sprockets, and a guide for said chain mounted on the auxiliary frame.

3. The combination in a rotary weeder with its main frame, drive shaft and rotary weeder rod disposed parallel with the shaft, and a drive sprocket on the shaft, of an auxiliary frame supported from the main frame and shaft, a countershaft having its longitudinal axis disposed at an angle to the shaft and rod and journaled in the auxiliary frame, a sprocket on the countershaft, a universal joint between said countershaft and the weeder rod, and a twisted drive chain between said sprockets.

4. The combination in a rotary weeder with its main frame, drive shaft and drive sprocket, and a rotary weeder rod disposed parallel with the shaft, of an auxiliary frame supported on said shaft, adjustable means for fastening the auxiliary frame to the main frame, a countershaft rearwardly and upwardly tilted with relation to the rod and journaled in the auxiliary frame, a universal joint between the countershaft and the weeder rod, a sprocket on the countershaft, and a twisted chain between said sprockets.

5. The combination in a rotary weeder with its main frame, drive shaft and drive sprocket, and a rotary weeder rod, of an auxiliary frame journaled on said shaft, adjustable means for fastening the auxiliary frame to the main frame, a countershaft rearwardly and upwardly tilted with relation to the rod and journaled in the auxiliary frame and a sprocket on said shaft, a universal joint between the countershaft and the weeder rod, a twisted chain between said sprockets, and a guide mounted on the auxiliary frame for the slack flight of the twisted chain.

In testimony whereof I affix my signature.

CLAUDE C. CALKINS.